United States Patent
Becker et al.

(10) Patent No.: US 12,451,965 B2
(45) Date of Patent: Oct. 21, 2025

(54) MODULAR INTEGRATED OPTICAL TRANSCEIVERS AND ARRAYS FORMED THEREWITH

(71) Applicant: BridgeComm, Inc., Denver, CO (US)

(72) Inventors: Ethan Earl Becker, Centennial, CO (US); Michael Morton Morrell, Frederick, CO (US); Paul Searcy, Niwot, CO (US); Barry Matsumori, Rolling Hills Estates, CA (US)

(73) Assignee: BridgeComm, Inc., Lafayette, CO (US)

( * ) Notice: Subject to any disclaimer, the term of this patent is extended or adjusted under 35 U.S.C. 154(b) by 0 days.

(21) Appl. No.: 17/677,748

(22) Filed: Feb. 22, 2022

(65) Prior Publication Data

US 2022/0271838 A1 Aug. 25, 2022

Related U.S. Application Data

(60) Provisional application No. 63/152,227, filed on Feb. 22, 2021.

(51) Int. Cl.
*H04B 10/40* (2013.01)

(52) U.S. Cl.
CPC ................... *H04B 10/40* (2013.01)

(58) Field of Classification Search
CPC .............. H04B 10/40; G02B 6/4249
See application file for complete search history.

(56) References Cited

U.S. PATENT DOCUMENTS

| | | | |
|---|---|---|---|
| 6,650,451 B1* | 11/2003 | Byers | H04B 10/1125 398/158 |
| 9,989,700 B1* | 6/2018 | Ayliffe | G02B 6/4246 |
| 10,862,586 B1 | 12/2020 | Searcy et al. | |
| 2002/0141020 A1* | 10/2002 | Doucet | H01B 11/22 398/58 |
| 2005/0089281 A1 | 4/2005 | Chiu et al. | |
| 2011/0243074 A1* | 10/2011 | Shin | H04L 41/12 398/118 |
| 2013/0039662 A1 | 2/2013 | Brooks et al. | |

(Continued)

OTHER PUBLICATIONS

Wittman-Regis, Agnes, "International Preliminary Report on Patentability for PCT Application No. PCT/US2022/017336," mailing date Aug. 31, 2023, 6 pages.

(Continued)

*Primary Examiner* — Pranesh K Barua
(74) *Attorney, Agent, or Firm* — King & Partners, PLC

(57) ABSTRACT

An optical transceiver system for transmitting and receiving optical signals includes a plurality of modular integrated optical transceivers and a control system for controlling components within the plurality of modular integrated optical transceivers. Each one of the plurality of modular integrated optical transceivers is configured for receiving and transmitting optical signals over a range of angles. Additionally, the control system is configured for providing transmit and receive signals to the plurality of modular integrated optical transceivers. Further, the plurality of modular integrated optical transceivers, collectively, allow transmitting and receiving of optical signals over a wider range of angles than the range of angles for each one of the plurality of modular integrated optical transceivers.

9 Claims, 7 Drawing Sheets

(56) References Cited

U.S. PATENT DOCUMENTS

| | | | | |
|---|---|---|---|---|
| 2014/0294399 A1* | 10/2014 | Makowski | ........... | H04B 10/118 |
| | | | | 398/126 |
| 2015/0349881 A1* | 12/2015 | Byers | ..................... | H04B 10/11 |
| | | | | 398/118 |
| 2016/0226584 A1* | 8/2016 | Chalfant, III | ........ | H04B 10/112 |
| 2016/0315758 A1 | 10/2016 | Pelekhaty et al. | | |
| 2017/0257167 A1* | 9/2017 | Adams | ............... | H04B 10/1149 |
| 2018/0059340 A1 | 3/2018 | Lin et al. | | |
| 2021/0314066 A1 | 10/2021 | Searcy et al. | | |

OTHER PUBLICATIONS

International Search Report and Written Opinion of the ISA, PCT/US2022/017336, completed Apr. 22, 2022, mailed May 27, 2022.
Roeloffzen et al., Low-loss Si3N4 TriPleX optical waveguides: Technology and applications overview; IEEE journal of selected topics in quantum electronics 24.4 (2018).

\* cited by examiner

MODULAR INTEGRATED OPTICAL TRANSCEIVERS AND ARRAYS FORMED THEREWITH

CROSS-REFERENCE TO RELATED APPLICATIONS

This application benefits from and claims priority to U.S. provisional patent application Ser. No. 63/152,227, filed Feb. 22, 2021, and entitled "Modular Integrated Optical Transceivers and Arrays Formed Therewith," the disclosure of which is incorporated herein by reference in its entirety.

TECHNICAL FIELD

Aspects of the present disclosure generally relate to optical communications and, more particularly, to integrated optical communication systems including optical communication transceivers.

BACKGROUND

Current communication systems rely on the use of radio frequencies (RF) for the data downlink from low Earth orbit (LEO) small satellite (SmallSat) or from Geosynchronous satellites (GEO). For example, communication channels between different geostationary earth orbit (GEO) satellites, between a GEO satellite and lower earth orbit (LEO) satellites, between a GEO satellite and a ground station, mobile user on an aircraft or submarine, or an unmanned autonomous vehicle (UAV) are currently possible using RF SmallSats. However, there are limitations to the data rates and data capacity of RF SmallSats used alone due to the frequency range and mechanical limitations of the current systems.

For example, the transceivers and ground stations of current systems require gimbals and other large mechanical means for physically scanning the field of view of the devices through a range of angles in order to be able to capture signal over those angles. This requirement is due to the fact that the currently available transceivers include a single aperture radio telescope or other antenna implementations for capturing and transmitting data signals therebetween. Such mechanical implementations are impractical or even detrimental for physical space and weight constrained applications such as on airplanes and UAVs.

New technologies, such as a Managed Optical Communication Array (MOCA) transceiver with multiple sub-transceivers (disclosed in U.S. Provisional App. No. 62/985,437 filed on 5 Mar. 2020), provide additional flexibility to free space optical (FSO) communication systems. An example of a transceiver with multiple MOCA sub-transceivers is shown in FIG. 1. The MOCA sub-transceivers can be fixedly located on a surface that may be planar or curved. As shown in FIG. 1, optical transceiver 100 is designed with a low profile to allow three sub-transceivers 110, 112, and 114 (i.e., TX1, TX2, and TX3, respectively) to be mounted pointing at different mounting angles ($\theta_1$, $\theta_2$, and $\theta_3$, respectively) as indicated by arrows 120, 122, and 124, respectively. This configuration allows the overall transceiver to send and receive signals over a larger field of view without a need to mechanically move the transceiver. For example, a desired field of view, covered by mounting $\theta_1$, $\theta_2$, and $\theta_3$, may be represented by the overlapping angle ranges $\beta_1$, $\beta_2$, and $\beta_3$ over which signals may be sent and received such that the transceiver does not need to be mechanically translated in order to enable optical communication over the desired field of view. That is, TX1, mounted at a mounting angle $\theta_1$, is able to send and receive optical signals over the angular range represented by angle range $\beta_1$; TX2, mounted at a mounting angle $\theta_2$, is able to send and receive optical signals over the angular range represented by angle range $\beta_2$; and TX3, mounted at a mounting angle $\theta_3$, is able to send and receive optical signals over the angular range represented by angle range $\beta_3$. As another example, only a portion of the desired field of view is covered by mounting angles $\theta_1$ to $\theta_N$, and a mirror, gimbal, piezoelectric motor, or other mechanical or optical arrangement can be used to cover the remainder of the desired field of view by providing a motion that is equal to or greater than $\theta_1$ to $\theta_3$. That is, if sub-transceiver 110 is oriented at $\theta_1$, and a single transceiver can access a full range of $\beta_1$, then transceiver can access $\theta_1 \pm \frac{1}{2}\beta_1$. As the angle range $\beta$ for the MOCA sub-transceiver can be on the order of 90-degrees or more, MOCA sub-transceivers can communicate over much larger angles with higher bandwidth compared to RF signals.

In other words, by using multiple sub-transceivers, with the possibility of overlapping (partially or completely) outputs, and parallel optical paths, additional functionality can be integrated into the overall network operations. In another example, each one of sub-transceivers 120, 122, and 124 is configured to send and/or receive signals with different beam parameters. For instance, each one of sub-transceivers 120, 122, and 124 can be configured to transmit an optical signal at a different frequency and/or polarization from each other sub-transceiver.

Further flexibility in the installation of the MOCA sub-transceivers would be desirable.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In accordance with the embodiments described herein, a modular integrated optical transceiver is disclosed. Several modular integrated optical transceivers may be arranged in arrays to provide additional flexibility in installation for specific applications, in accordance with an embodiment.

An associated method for using one or more modular integrated optical transceivers is also described.

More particularly, an optical transceiver system for transmitting and receiving optical signals includes a plurality of modular integrated optical transceivers and a control system for controlling components within the plurality of modular integrated optical transceivers, in accordance with an embodiment. Each one of the plurality of modular integrated optical transceivers is configured for receiving and transmitting optical signals over a range of angles. Additionally, the control system is configured for providing transmit and receive signals to the plurality of modular integrated optical transceivers. Further, the plurality of modular integrated optical transceivers, collectively, allow transmitting and receiving of optical signals over a wider range of angles than the range of angles for each one of the plurality of modular integrated optical transceivers.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures. The appended drawings illustrate only some implementation and are therefore not to be considered limiting of scope.

DETAILED DESCRIPTION

Figure 1:
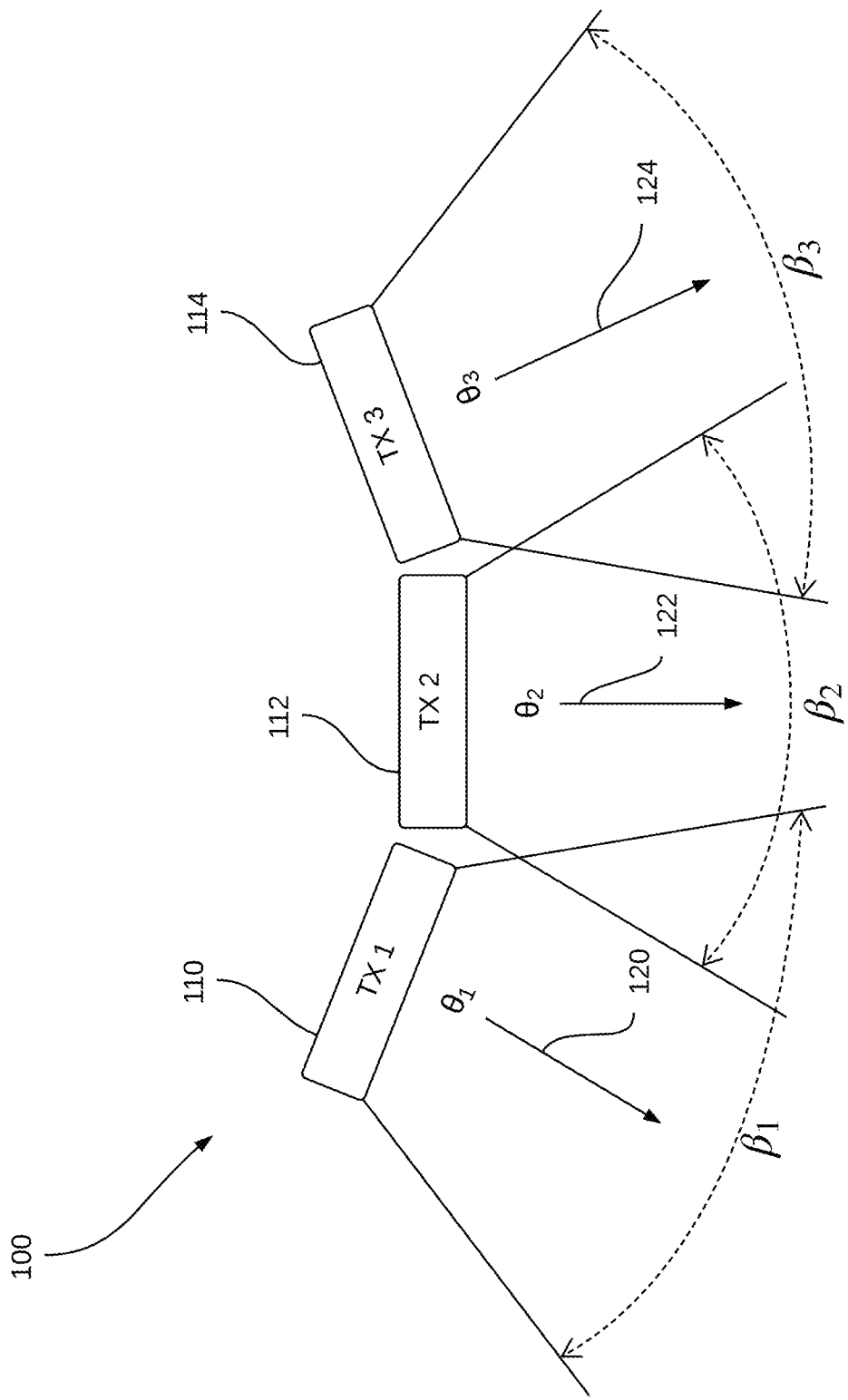
FIG. 1 illustrates an exemplary Managed Optical Communications Array (MOCA) transceiver arrangement.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

New technologies, such as a Managed Optical Communication Array (MOCA) transceiver with multiple sub-transceivers (disclosed in U.S. Provisional App. No. 62/985,437 filed on 5 Mar. 2020, 63/053,590 filed on 18 Jul. 2020, and 63/053,590 filed on 18 Jul. 2020, all of which are incorporated herein in their entirety by reference), provide additional flexibility to free space optical communication (FSOC) systems, alone or in combination with RF systems. The MOCA transceiver technology can be harnessed to support multipoint wireless communications, including non-mechanical beam steering and tracking of targeted users.

To this end, integration of MOCA transceiver elements into enclosed modular components that can be arrayed as desired would provide further advantages in providing flexible, scalable implementation of MOCA technology in a variety of settings. For instance, by containing each individual MOCA transceiver in an integrated package that can be connected, disconnected, and arrayed at will, the MOCA transceiver technology can be more readily adapted to the form factor requirements of a variety of applications in terrestrial (e.g., mobile 5G), airborne, and space environments. The notion of a compact and integrated form factor enables optimized packaging as well as creation of arrays with the close proximity of optical apertures for optical communication links. Such a modular, integrated packaging of the MOCA transceiver can support non-mechanical steering of an optical communication beam over a wide field of view, and be applicable for a variety of bi-directional and/or full duplex communication implementations.

Figure 2:
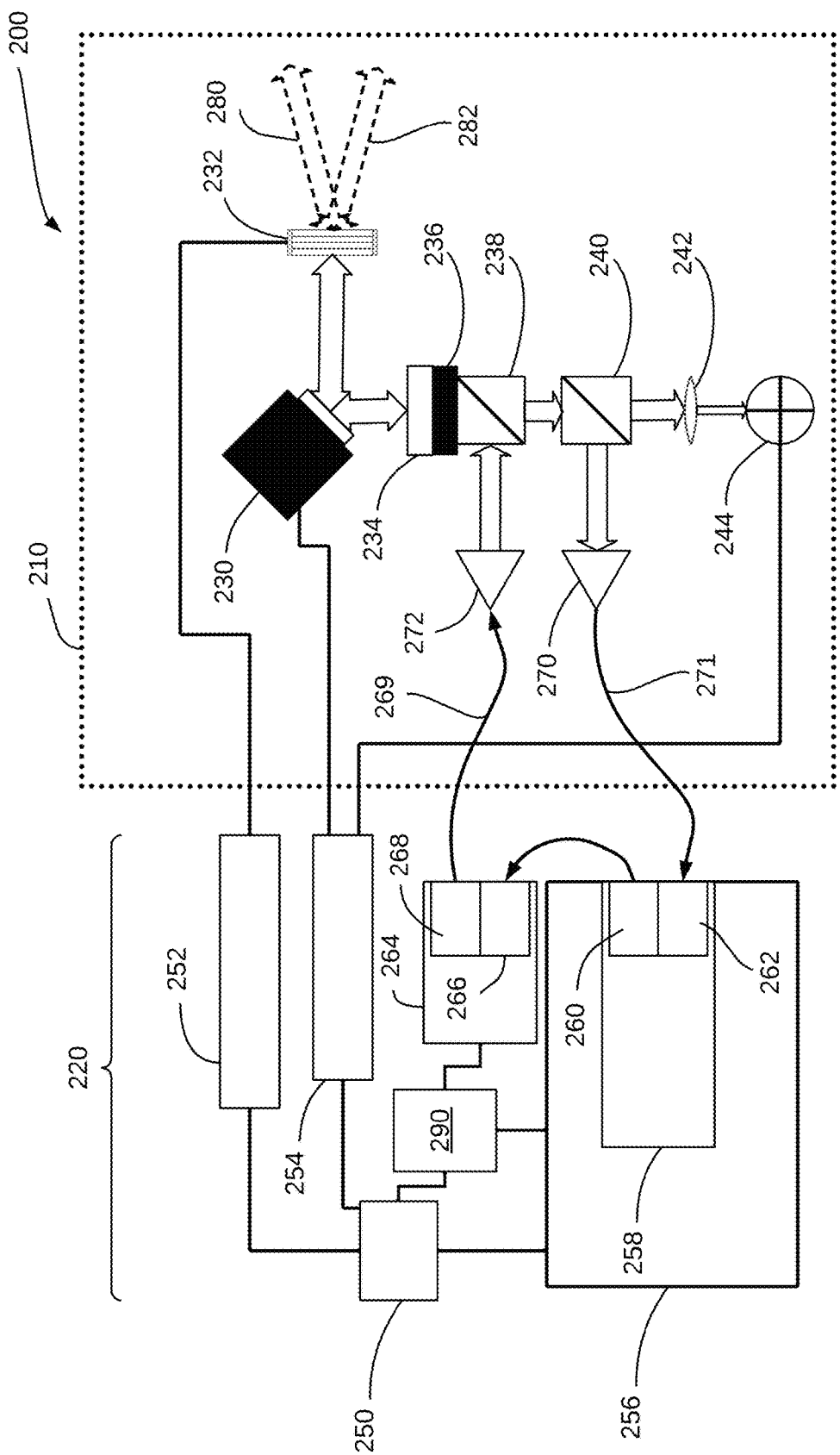
FIG. 2 shows an implementation of an exemplary modular integrated optical transceiver, in accordance with an embodiment.

FIG. 2 shows an implementation of an exemplary modular integrated optical transceiver, in accordance with an embodiment. A transceiver system 200 includes a modular, integrated optical transceiver 210 controlled by a control system 220. Transceiver system 200, in embodiments, serves as an optical head assembly to support the implementation of MOCA technology therein.

In the exemplary embodiment illustrated in FIG. 2, integrated optical transceiver 210 contains components of a MOCA transceiver, including a fine steering mirror (FSM) 230, a liquid crystal (LC) switch 232, a quarter-wave plate 234, a Faraday rotator 236, a polarizing beam splitter 238, a beam sampler 240, a focusing lens 242, a position sensitive detector (PSD) quad cell 244, a receive collimator 270, and a transmit collimator 272. Control system 220 includes components for regulating various portions of integrated optical transceiver 210, such as an optics controller 250, a LC switch controller 252, and a FSM controller 254, and a modem/router 256. Modem/router 256 can further include a small form-factor (SFP) module 258 including a transmitter port 260 and a receiver port 262 for receiving a receive signal (represented by an arrow 271). Receive signal 271 may be, for example, an optical signal transmitted via an optical fiber from receive collimator 270. It is noted that the various components listed above are only exemplary, and other equivalent components may be substituted in accordance with, for example, the MOCA transceiver embodiments described in the patent applications referenced above.

Control system 220, as shown in the example illustrated in FIG. 2, further includes an amplifier 264, which in turn includes an input port 266 and an output port 268 for outputting a transmit signal (represented by an arrow 269). Transmit signal 269 may be, for instance, an optical signal transmitted via an optical fiber to transmit collimator 272. Modem/router 256 and amplifier 264 may include multiple access ports and/or multiplexing and demultiplexing capabilities so as to be configured for receiving and transmitting multiple inputs and outputs, respectively. Further, optics controller 250, LC switch controller 252, and FSM controller 254 may include multiple output ports for separately and simultaneously controlling multiple integrated optical transceivers.

As shown in FIG. 2, optical transceiver 210 and control system 220 are configured to cooperate with each other such that optical transceiver 210 receives and transmits optical signals over a range of angles, as represented by light rays 280 and 282. The optical signals may include transmit optical signals generated at transmit port 260 of modem/router 258 via amplifier 264, or receive optical signals received at receive port 262. Optical transceiver 210 and control system 220 may be co-located, integrated into a single unit, or may be located remotely from each other. For instance, control system 220 may control one or more optical transceivers 210. Further, control system 220 may include a processor 290 for regulating the functions of optics controller 250, modem/router 256, and amplifier 264, as well as processing the It is noted that Faraday rotator 236 may serve to ensure maintenance of a single polarity design as used in a LC-based architecture MOCA transceiver architecture. As shown in FIG. 2, quarter-wave plate 234 and Faraday rotator 236 may be positioned adjacent to each other and/or attached together as a common component.

Figure 3:
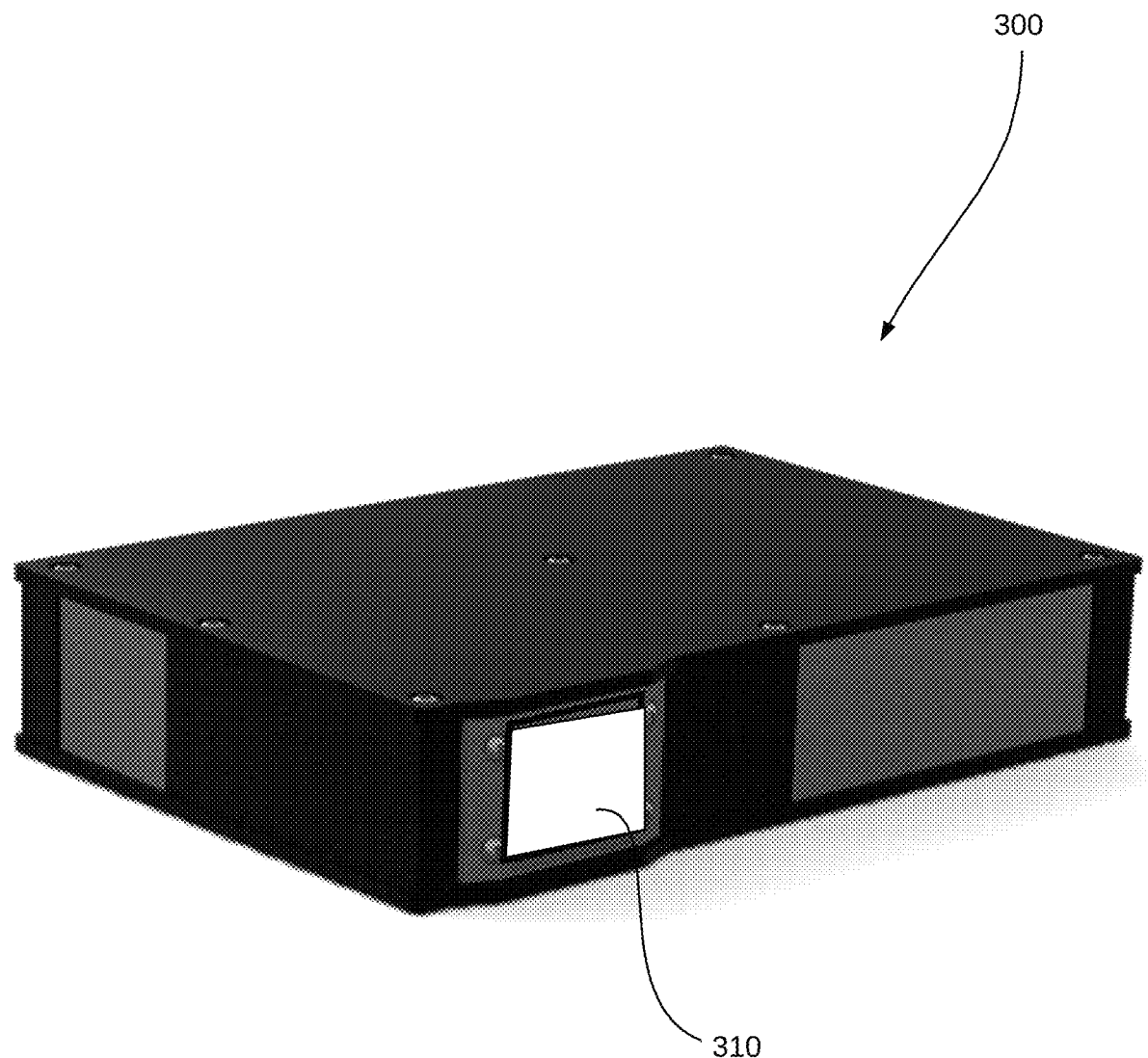
FIG. 3 shows a modular integrated optical transceiver, in accordance with an embodiment.

FIG. 3 shows a optical transceiver module 300, in accordance with an embodiment. In an embodiment, optical transceiver module 300 includes the components of optical transceiver 210 therein, with electrical and optical connections to a controller (e.g., controller 220) located outside of optical transceiver module 300. In another embodiment, optical transceiver module 300 contains both optical transceiver 210 and control system 200 therein. An optical aperture 310 is located on a narrow edge of optical transceiver module 300, as shown in the example illustrated in FIG. 3. As an example, optical aperture 310 is configured to enable optical transmission of light rays 280 and 282 therethrough to and from LC switch 232 of optical transceiver 210.

Figure 4:
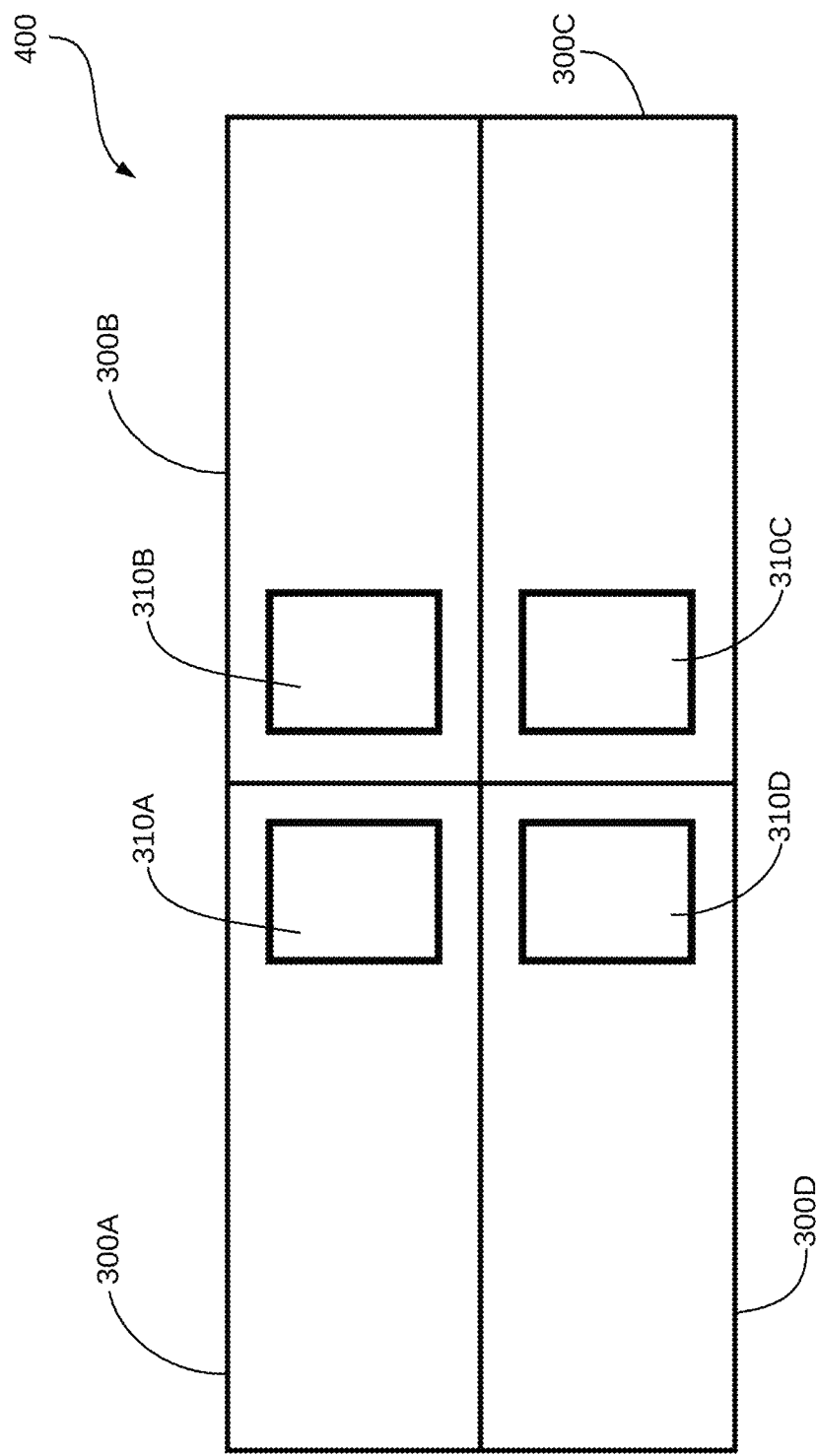
FIG. 4 shows a stacked array of modular integrated optical transceivers, in accordance with an embodiment.

FIG. 4 shows a stacked array 400 including several optical transceiver modules 300, in accordance with an embodiment. As shown in FIG. 4, stacked array 400 includes optical transceiver modules 300A-300D, each module being packaged within a module housing, and the module housing are stacked such that the respective optical apertures 310A-310D are clustered in close proximity in a two-by-two grid. In an example, each one of optical transceiver modules includes the components of optical transceiver 210 therein, with electrical and optical connections protruding therefrom for connection to one or more control systems 200.

The modular packaging of optical transceiver module 300 enables the clustering of multiple MOCA optical transceivers in a flexible geometric pattern to support a broad set of connectivity services, such as multi-link, multi-transmitter, or multi-receiver arrangements. For example, multiple optical transceiver modules 300 may be clustered to provide a MOCA array used for supporting multiple users and/or for providing a user tracking function in a mobility application. While a two-by-two array of optical apertures 310A-310D is shown in FIG. 2, an arbitrary number of N vertical optical transceiver modules and M horizontal optical transceiver modules formed into a N-by-M array, if so desired.

Figure 5:
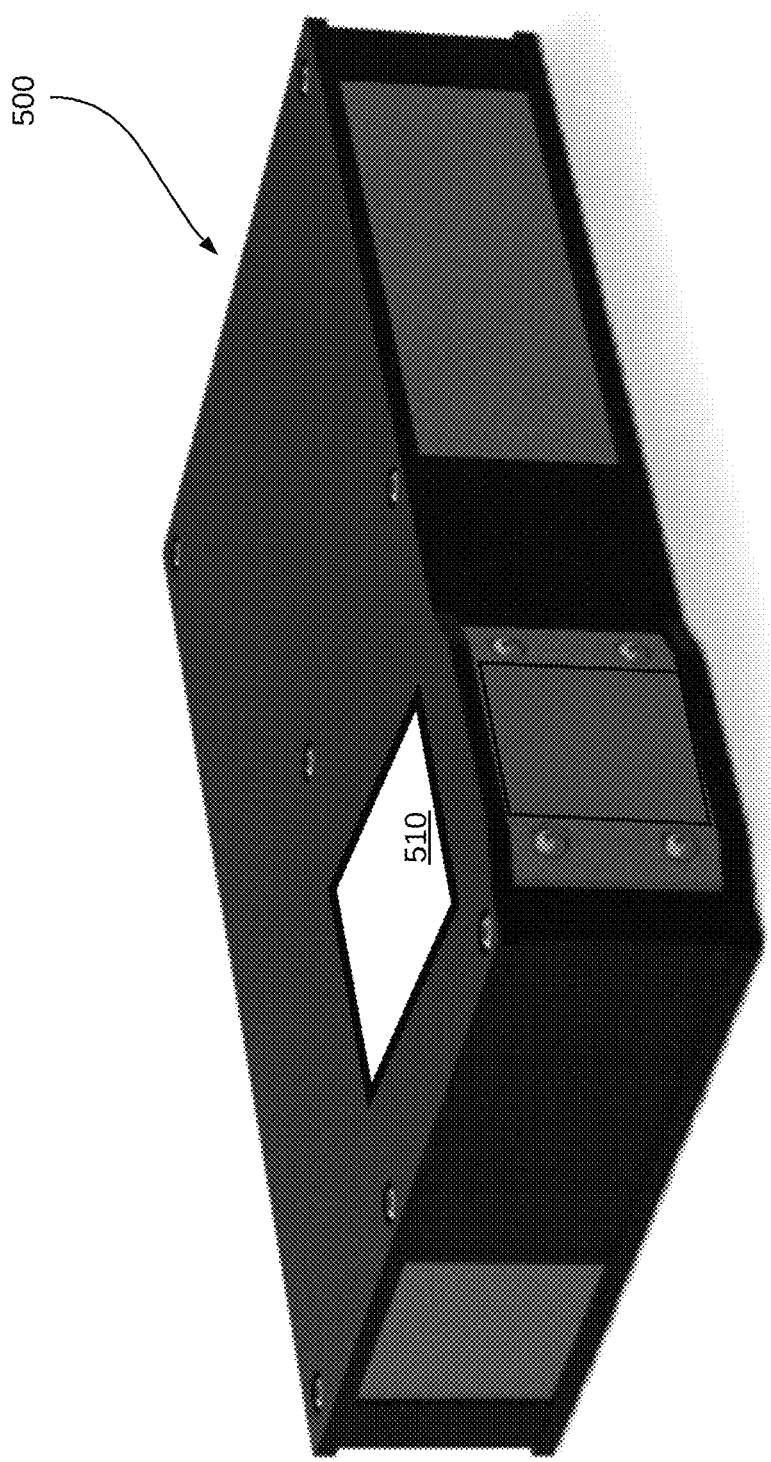
FIG. 5 shows an alternative modular integrated optical transceiver, in accordance with an embodiment.

FIG. 5 shows an alternative optical transceiver module 500, in accordance with an embodiment. Optical transceiver module 500 includes an optical aperture 510 located on a wide surface of optical transceiver module 500, rather than on a narrow edge. Like optical aperture 310 of optical transceiver module 300 of FIG. 3, optical aperture 510 is configured for transmitting and receiving therethrough light rays 280 and 282 transmitted and received from LC switch 232.

Figure 6:
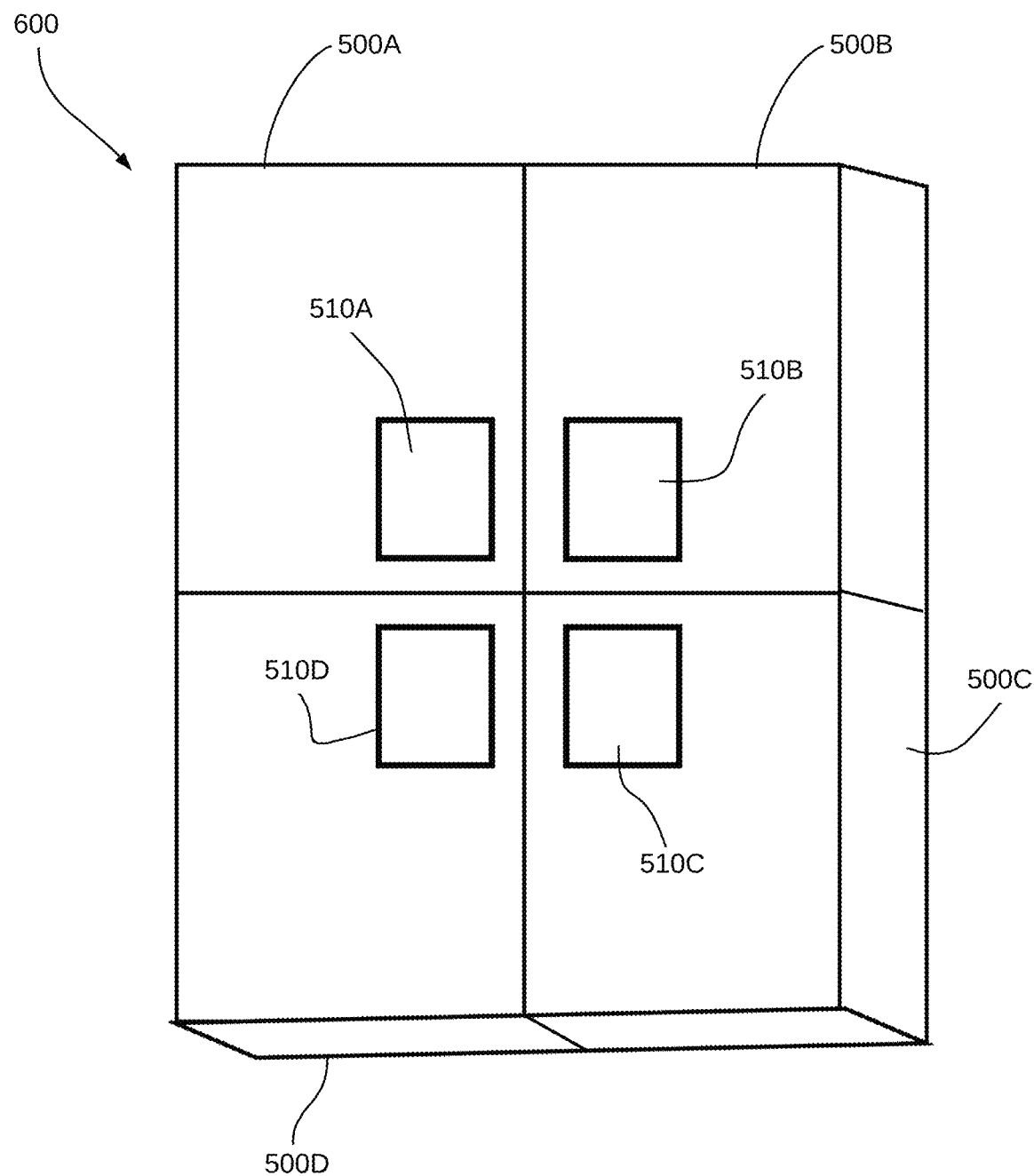
FIG. 6 illustrates a planar array of modular integrated optical transceivers, in accordance with an embodiment.

Due to the placement of optical aperture 510, several optical transceiver modules 500 can be tiled, rather than stacked as shown in FIG. 4, for form an array. FIG. 6 illustrates a front view 600 of a tiled, planar array of optical transceiver modules, in accordance with an embodiment. This tiling arrangement is particularly attractive for applications in which overall thickness for the optical transceiver array is to be minimized.

As shown in FIG. 6, a plurality of optical transceiver modules 500A-500D are tiled such that the respective optical apertures 510A-510D are arranged in a two-by-two array. Again, an arbitrary number of optical transceiver modules 500 may be tiled together in a N×M array.

Figure 7:
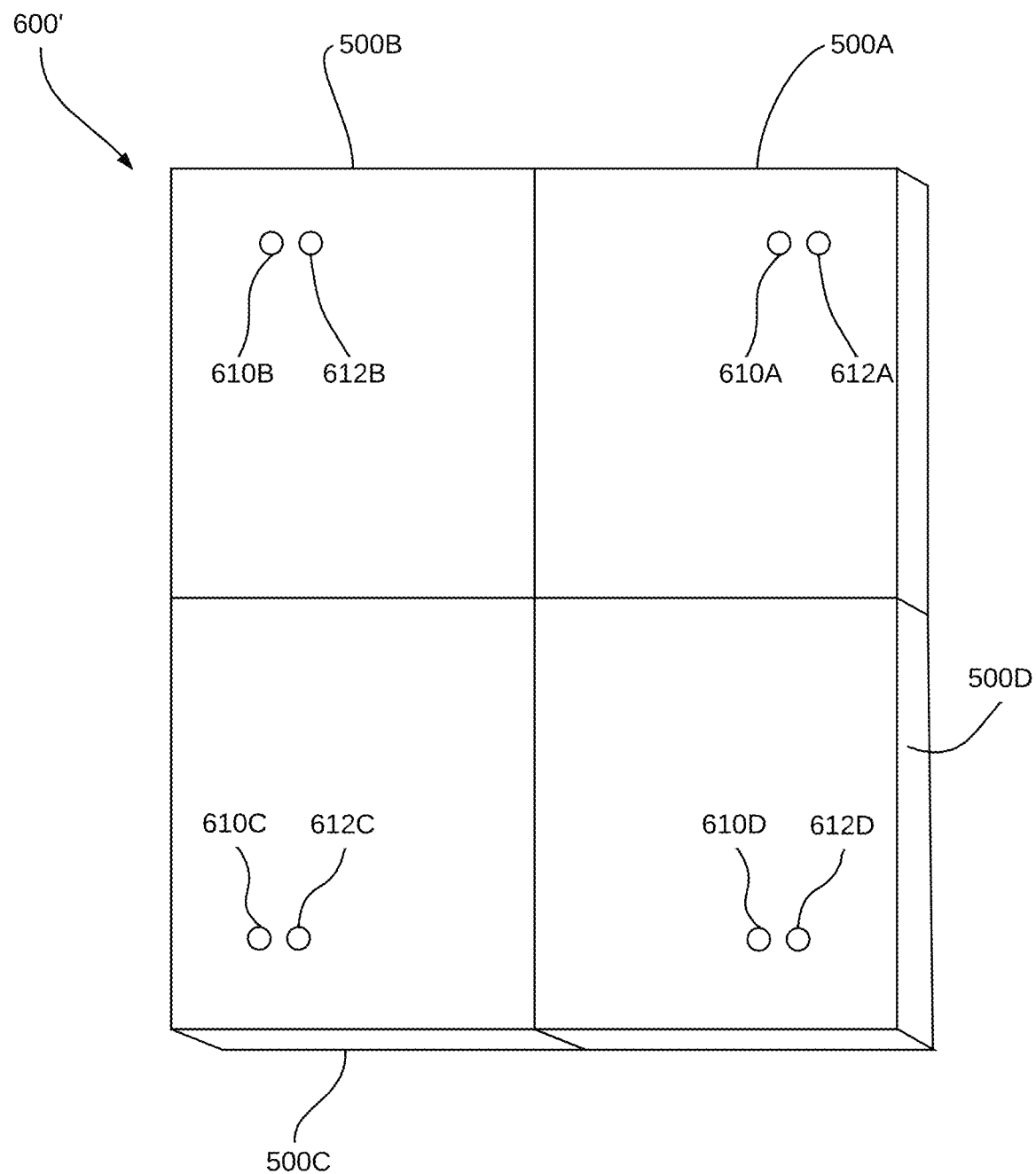
FIG. 7 illustrates a backside of the planar array of FIG. 6, in accordance with an embodiment.

FIG. 7 illustrates a backside view 600' of the planar array of FIG. 6, in accordance with an embodiment. In particular, FIG. 7 shows the inputs (610A-610D) and outputs (612A-612D) of arrayed optical receiver modules, which may be connected with a control system (e.g., control system 220 of FIG. 2) via a mechanism such as a free space optical link, solid state waveguide, a fiber optic link, or electrical connection. In this way, a single control system may be used to control multiple optical transceiver modules. It is noted that the specific location of the inputs and outputs may be varied according to the internal layout of the components within each optical receiver module, without veering from the spirit of the present disclosure.

The packaging of the MOCA transceivers into modules, then stacking or tiling of the optical transceiver modules, enables a variety of new capabilities, both in terms of the number and types of links that it is able to support, by enabling the formation of flexible and reconfigurable optical transceiver arrays. The functionalities of multiple optical transceivers may be coordinated and controlled so as to serve, for example, as a multi-link, multi-transmitter, or multi-receiver system. In a multi-link system, separate MOCA optical transceivers maintain a common or separate links with other MOCA optical transceivers in the array, with data intelligently shared through a common MOCA data handling system, in an example. Such a configuration allows an increase in bandwidth of the optical transceiver array system by increasing the number of active links and the amount of available bandwidth, while also allowing seamless bridging of links for the creation on complex network topographies. In a multi-transmitter system, two or more optical transceiver modules work together to target and direct their signals along the same link path, for instance. By coordinating the transmission of a common signal from each optical transceiver module, an effective increase in overall transmitted optical power can be achieved, allowing longer link ranges to be achieved than possible using a single transceiver. Similarly, a multi-receiver system coordinates multiple optical transceiver modules to receive and combine the received signal from a common source, thus allowing an effective increase in collection area and an increase in link ranges verses in comparison to what can be achieved by a single optical transceiver.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

For instance, the modular integrated optical transceiver designs described above can be implemented in varied forms of component integration and therefore variability of overall form factor and volume can be modulated depending on requirements for a given application. An element of further integration may include the use of additive manufacturing of components. Optical components can also be combined that are described in discrete form in this design.

Accordingly, many different embodiments stem from the above description and the drawings. It will be understood that it would be unduly repetitious and obfuscating to literally describe and illustrate every combination and sub-combination of these embodiments. As such, the present specification, including the drawings, shall be construed to constitute a complete written description of all combinations and subcombinations of the embodiments described herein, and of the manner and process of making and using them, and shall support claims to any such combination or subcombination.

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An optical transceiver system for transmitting and receiving optical signals, the system comprising:
   a plurality of optical transceiver modules, each one of the plurality of optical transceiver modules including therein
      a modular integrated optical transceiver and
      a control system for controlling components within the modular integrated optical transceiver,
   wherein, in each one of the plurality of optical transceiver modules,
      the modular integrated optical transceiver is configured for receiving and transmitting the optical signals over a range of angles, the optical signals including transmit and receive signals,
      the control system is configured for providing transmit signals to the modular integrated optical transceiver and,
      the control system is further configured for receiving receive signals from the modular integrated optical transceiver,
   wherein the plurality of optical transceiver modules, collectively, allow transmitting and receiving of the optical signals over a wider range of angles than the range of angles for each modular integrated optical transceiver included in one of the plurality of optical transceiver modules, without mechanically translating the modular integrated optical transceiver,
   wherein each one of the plurality of optical transceiver modules is configured to be connected, disconnected, and arrayed at will with other one of the plurality of optical transceiver modules in a flexible and scalable implementation,
   wherein each one of the modular integrated optical transceiver modules includes:
      a fine steering mirror,
      a liquid crystal switch,
      a quarter-wave plate,
      a Faraday rotator,
      a polarizing beam splitter,
      a beam sampler,
      a focusing lens,
      a position sensitive detector quad cell,
      a receive collimator, and
      a transmit collimator, and wherein the fine steering mirror and the liquid crystal switch cooperate to provide non-mechanical beam steering over the wider range of angles.

2. The optical transceiver system of claim 1, wherein the plurality of optical transceiver modules are configured to be adapted to form factor requirements of applications including terrestrial, airborne, and space environments.

3. The optical transceiver system of claim 1, wherein the each one of the plurality of optical transceiver modules is configured to be disposed adjacent to each other in: a) a stacked configuration; and b) an arrayed configuration.

4. The optical transceiver system of claim 3, wherein the plurality of optical transceiver modules are arranged to receive and transmit optical signals over an area larger than a single one of the plurality of optical transceiver modules.

5. The optical transceiver system of claim 1, wherein the control system includes
 an optics controller,
 a liquid crystal switch controller,
 a fine steering mirror controller,
 a modem/router, and
 an amplifier.

6. The optical transceiver system or claim 5, wherein the modem/router includes a transmitter port and a receiver port.

7. The optical transceiver system of claim 1, wherein the quarter-wave plate and the Faraday rotator cooperate to provide a single polarity at the liquid crystal switch.

8. An optical transceiver system for transmitting and receiving optical signals, the system comprising:
 a plurality of optical transceiver modules, each one of the plurality of optical transceiver modules including therein a modular integrated optical transceiver; and
 a control system for controlling components within the plurality of optical transceiver modules,
 wherein, in each one of the plurality of optical transceiver modules, the modular integrated optical transceiver is configured for receiving and transmitting the optical signals over a range of angles, the optical signals including transmit and receive signals,
 wherein the control system is configured for providing transmit signals to the modular integrated optical transceiver in each one of the plurality of optical transceiver modules,
 wherein the control system is further configured for receiving receive signals from the modular integrated optical transceiver in each one of the plurality of optical transceiver modules,
 wherein the plurality of optical transceiver modules, collectively, allow transmitting and receiving of the optical signals over a wider range of angles than the range of angles for the modular integrated optical transceiver without mechanically translating the modular integrated optical transceiver,
 wherein each one of the plurality of optical transceiver modules is configured to be connected, disconnected, and arrayed at will with another one of the plurality of optical transceiver modules in a flexible and scalable implementation,
 wherein the components of each one of the modular integrated optical transceiver modules includes:
  a fine steering mirror,
  a liquid crystal switch,
  a quarter-wave plate,
  a Faraday rotator,
  a polarizing beam splitter,
  a beam sampler,
  a focusing lens,
  a position sensitive detector quad cell,
  a receive collimator, and
  a transmit collimator, and
 wherein the fine steering mirror and the liquid crystal switch cooperate to provide non-mechanical beam steering over the wider range of angles.

9. The optical transceiver system of claim 8, wherein the quarter-wave plate and the Faraday rotator cooperate to provide a single polarity at the liquid crystal switch.

* * * * *